United States Patent [19]

Bennett

[11] Patent Number: 4,590,817
[45] Date of Patent: May 27, 1986

[54] GEAR SELECTOR MEANS

[75] Inventor: John S. Bennett, Ufton, England

[73] Assignee: Massey-Ferguson Inc., Detroit, Mich.

[21] Appl. No.: 585,971

[22] Filed: Mar. 1, 1984

[30] Foreign Application Priority Data

Mar. 15, 1983 [GB] United Kingdom ................ 8307095

[51] Int. Cl.⁴ ............................................. B60K 20/02
[52] U.S. Cl. ................................. 74/473 R; 74/480 R
[58] Field of Search ............ 74/346, 364, 365, 473 R, 74/480 R

[56] References Cited

U.S. PATENT DOCUMENTS 3,757,598  9/1973  Van Dest ........................... 74/473 R
4,483,210  11/1984 Mayuzumi ......................... 74/473 R
4,494,418  1/1985  Bellah et al. ....................... 74/473 R Primary Examiner—Stephen F. Husar
Attorney, Agent, or Firm—Robert L. Farris

[57] ABSTRACT

A gear selector means for use with a transmission having a main change speed gear set (X) and one or more associated range change gear sets (Y, Z). The selector means includes a selector member (50) which is movable to a number of positions (1, 2, 3, 4) for the selection of a number of change speed ratios of the transmission and which has a neutral position or series of positions (n) corresponding to a neutral condition of the transmission. The selector member is movable from the or a neutral position (n) to an "up" position (52) in which upward range changes can be made in a predetermined sequence (A, B, C, D) and to a "down" position (53) in which downward range changes can be made in a predetermined sequence, each movement of the selector member to the "up" or "down" position being arranged to change the operative range of the transmission either up or down to the next range in the predetermined sequence.

8 Claims, 7 Drawing Figures

| FORWARD RANGE | FORWARD RATIO No. | INPUT TRAIN Z GEARS USED BY REFERENCE No | | MAIN TRAIN X GEARS USED BY REFERENCE No. | | | | OUTPUT TRAIN Y GEARS USED BY REFERENCE No. | |
|---|---|---|---|---|---|---|---|---|---|
| | | 29,32 | 28,31 | 10,15 | 11,16 | 12,17 | 13,18 | Q 25 | 13,18, Q |
| A | 1 | X | | X | | | | X | |
| | 2 | X | | | X | | | X | |
| | 3 | X | | | | X | | X | |
| | 4 | X | | | | | X | X | |
| B | 5 | | X | X | | | | X | |
| | 6 | | X | | X | | | X | |
| | 7 | | X | | | X | | X | |
| | 8 | | X | | | | X | X | |
| C | 9 | X | | X | | | | | X |
| | 10 | X | | | X | | | | X |
| | 11 | X | | | | X | | | X |
| | 12 | X | | | | | X | | X |
| D | 13 | | X | X | | | | | X |
| | 14 | | X | | X | | | | X |
| | 15 | | X | | | X | | | X |
| | 16 | | X | | | | X | | X |

FIG. 3

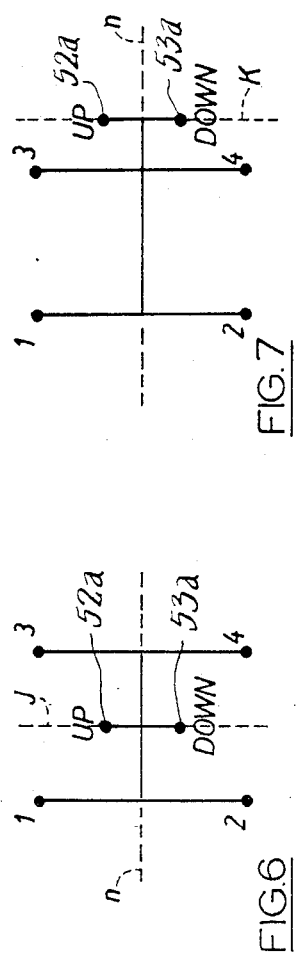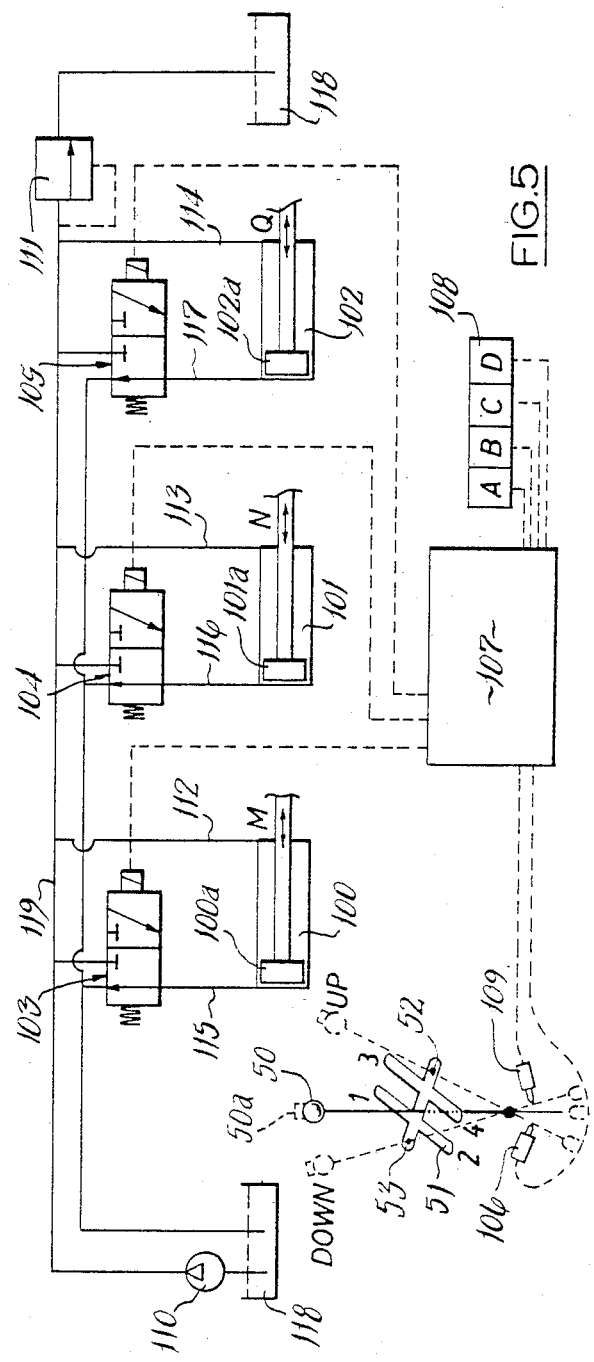
FIG.7
FIG.6
FIG.5

GEAR SELECTOR MEANS

TECHNICAL FIELD

This invention relates to gear selector means for vehicle transmissions.

There is a longstanding requirement to provide a simple and easy to use gear selector means for use on a transmission having a main change speed gear set and one or more associated range change gear sets.

DISCLOSURE OF THE INVENTION

It is an object of the present invention to meet this requirement.

Thus, according to the present invention there is provided a gear selector means for use with a transmission having a main change speed gear set and one or more associated range change gear sets, the selector means including a selector member which is movable to a number of positions for the selection of a number of change speed ratios of the transmission and which has a neutral position or series of positions corresponding to a neutral condition of the transmission, the selector member being movable from the or a neutral position to an "up" position in which upward range changes can be made in a predetermined sequence and to a "down" position in which downward range changes can be made in a predetermined sequence, each movement of the selector member to said "up" or "down" position being arranged to change the operative range of the transmission either up or down to the next range in said predetermined sequence.

The selector member may have a neutral plane of movement corresponding to a neutral condition of the transmission and the "up" and "down" positions may be reached by further movement of the selector member in extensions of said neutral plane at opposite ends of said plane. In an alternative arrangement the "up" and "down" positions are reached from the neutral plane by movement of the selector member in opposite directions in a plane at right angles to said neutral plane. The neutral plane may be provided, for example, by the crossbar of an H-shaped selector member shift pattern.

DESCRIPTION OF THE DRAWINGS

One embodiment of the present invention will now be described with reference to the accompanying drawings in which:

FIG. 3 shows the gear wheels used in each forward ratio of the transmission;

FIG. 5 diagrammatically shows a gear selector means system in accordance with the present invention, and FIGS. 6 and 7 diagrammatically show alternative selector lever shift patterns in accordance with the present invention.

BEST MODE OF CARRYING OUT INVENTION

Figure 1:
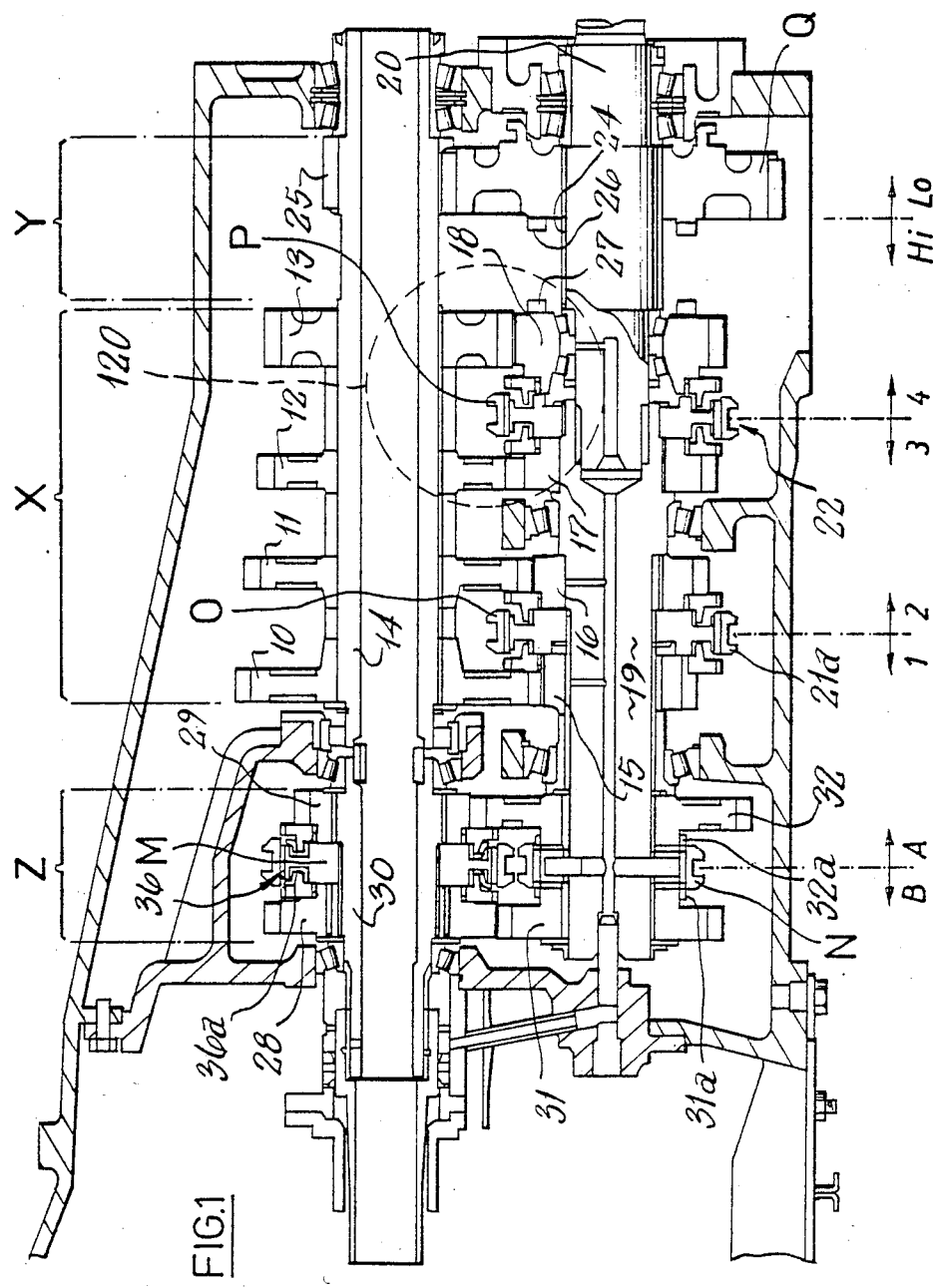
FIGS. 1 and 2 show a transmission of the type specified.

The transmission (shown in FIG. 1) comprises a main fourspeed change speed gear set X, a two-speed High/-Low output gear set Y, and a constant mesh input gear set Z capable of providing two forward ratios and two reverse ratios.

The main change speed set X comprises four gears 10, 11, 12 and 13 which are splined onto a lay shaft 14 and four constant mesh gears 15, 16, 17 and 18 which are rotatably mounted on the two portions 19 and 20 of the transmission output shaft.

Gears 15 and 16 are associated with synchromesh unit 21 which has a slidable sleeve O and which provides first and second ratios by sliding sleeve O to the left and right respectively while gears 17 and 18 are associated with synchromesh unit 22 which has a slidable sleeve P and which provides third and fourth ratios by sliding P to the left and right respectively.

The output gear set Y comprises a gear Q slidable on splines 24 provided on the output shaft portion 20. This gear Q is engageable with a gear 25 which rotates with the lay shaft 14 to provide a low output train ratio. By sliding the gear Q on the splines 24, teeth 26 on the gear Q can be meshed with co-operating teeth 27 on the gear 18 thus locking the gear 18 to the shaft portion 20 and providing a higher output train ratio via gears 13 and 18.

Figure 2:
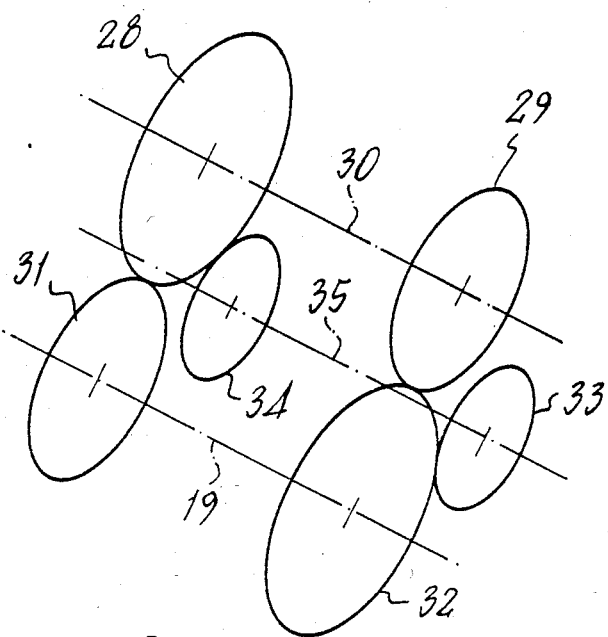

The input gear set Z comprises gears 28 and 29 which are rotatably mounted on an input shaft 30. These two gears are in constant mesh with gears 31 and 32 which are in turn rotatably mounted on the output shaft portion 19. Mounted behind the gears 28, 29, 21 and 32 as viewed in FIG. 1, are two idler gears 33 and 34 shown diagrammatically in FIG. 2 which mesh with gears 32 and 28 respectively. The idler gears rotate with a common shaft 35.

Associated with the gears 28 and 29 is a synchromesh unit whose sleeve M can be used to couple either the gear 28 or the gear 29 to the input shaft 30. A simple sliding collar N is used for coupling either the gear 31 or 32 to the output shaft 19 although a further synchromesh unit could be used if desired.

The input gear set Z can be arranged to provide a high forward ratio by moving the sleeve to the left to couple the gear 28 to the input shaft 30 and also sliding the collar N to the left to contact the gear 31 with the shaft portion 19. A low forward ratio can be provided by engaging the sleeve with the gear 29 and sliding the collar N to the right to couple the gear 32 with the shaft portion 19.

A first reverse ratio is obtained from the input shaft Z when the sleeve M couples the gear 28 to the input shaft 30 and the collar N couples the gear 32 to the shaft portion 19. With the synchronising sleeve and the collar in these positions drive passes from the input shaft 30 via gear 28, gear 34, shaft 35, gear 33 and gear 32 to the shaft portion 19. A further reverse ratio is obtained by engaging the synchronising sleeve M with the gear 29 and moving the collar N to couple the gear 31 with the shaft portion 19. In this condition drive is transmitted from the input shaft 30 via gear 29, gear 32, gear 33, shaft 35, gear 34, gear 28 and gear 31 to the shaft portion 19.

Thus the input set Z, is capable of providing two forward ratios and two reverse ratios which enable the whole transmission to provide, if required, sixteen forward ratios and sixteen reverse ratios.

The sixteen forward ratios of the transmission are split into four ranges A, B, C and D with each of the four ratios of the main change speed set X being engageable in each range.

Range A is engaged when the drive through the input train Z is via gears 29 and 32 and the drive through output train Y is via gears Q and 25.

Range B is engaged when the drive through input train Z is via gears 28 and 31 and the drive through output train Y is via gears Q and 25.

Range C is engaged when the drive through input train Z is via gears 29 and 32 and the drive through output train Y is via gears 13, 18 and Q.

Range D is engaged when the drive through input train Z is via gears 28 and 31 and the drive through output train Y is via gears 13, 18 and Q.

As will be appreciated from the above, the operative range of the transmission is selected by the drive path which is selected in gear trains Z and Y. The gear wheels used to engage each of the sixteen forward ratios is summarised in tabular form in FIG. 3.

The necessary movement of the coupling sleeves M and N of input gear set Z and the movement of gear Q of output gear set Y is achieved hydraulically as will be described later using hydraulic cylinders respectively operated by solenoid-controlled valves 103, 104 and 105 shown in FIG. 5.

FIG. 5 diagrammatically shows a system for achieving the necessary movement of coupling sleeves M and N of input gear set Z and the movement of gear Q of output gear set Y to effect the range changes.

In the arrangement shown in FIG. 5, a pump 110 provides a source of pressurised fluid to a supply line 119 which is used to operate hydraulic cylinders 100, 101 and 102 under the control of solenoid-operated valves 103, 104 and 105 respectively. The cylinders 100, 101 and 102 are all of the double-acting type with a differential area piston 100a, 101a and 102a respectively. The smaller area side of each piston is permanently subjected to the supply line pressure (which is controlled by a pressure maintaining valve 111) via lines 112, 113 and 114 respectively. The larger area side of each piston is connected via lines 115, 116 and 117 and the valves 103, 104 and 105 with either sump 118 or supply line 119. Each of the valves 103, 104 and 105 is biased to the position shown in FIG. 5 in which lines 115, 116 and 117 are connected with the sump 118 so that each cylinder 100, 101 and 102 occupies its retracted state. In order to extend any cylinder, the solenoid of the associated valve is actuated to change the condition of the valve so that both ends of the cylinder are subjected to the pressure in supply line 119. Due to the differential area of the piston this results in the piston being displaced to the right as viewed in FIG. 5 thereby extending the cylinder and moving the associated sleeve M and N or gear Q.

The solenoid valves which initiate the range changes are controlled (as will be described below) by a gear lever 50 which also controls the selection of the operative ratio in the main change gear set X. Control of the main change speed gear set X may be achieved mechanically using, for example, the selector mechanism described and claimed in copending U.S. patent application Ser. No. 06/672,329, filed on Nov. 2, 1984. (Which claims priority from U.K. patent application No. 8 307 097) in which the gear lever 50 operates in an H-shaped shift pattern 51 as shown in FIGS. 4 and 5.

Figure 4:
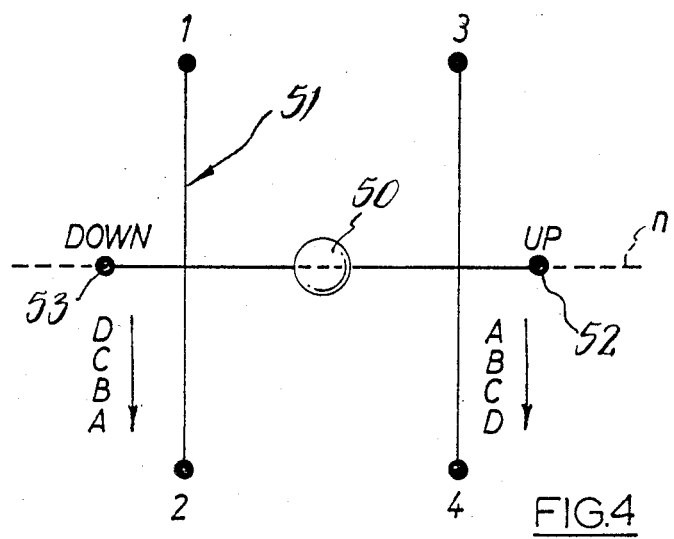
FIG. 4 diagrammatically shows one form of selector lever shift pattern in accordance with the present invention.

In accordance with the present invention the H-shaped shift pattern 51 of FIG. 4 and 5 in addition to the four change speed positions (designated 1, 2, 3 and 4) also includes two additional range-change positions an "up" position 52 and a "down" position 53. Both these positions lie in extensions of the neutral plane n of the gear lever 50, movement of the lever 50 to either position from the 1-2 and 3-4 planes being achieved against spring loading.

Thus if the operator wishes to make a downward range change he moves the gear lever 50 to the "down" position 53 and thus produces an electrical signal from a switch 109 or other sensing device associated with the "down" position. This signal is fed to an electrical circuit 107 which processes the signal and produces an output signal to one or more of the solenoid valves 103, 104 and 105 as necessary to initiate a downward range change to the next range in the range sequence D,C,B,A by extending and/or retracting cylinders 100, 101 and 102. If he wishes to change down two or even three ranges the lever 50 must be moved two or three times to the "down" position, each movement of the lever initiating a downward range change. If the operator attempts the change down when already in range A no action is initiated by circuit 107. The operative range (e.g. A,B,C or D) is at all times displayed to the operator by an indicator light system 108 connected with circuit 107.

In a similar manner upward range changes in the range sequence A, B, C and D are initiated on each movement of gear lever 50 to the "up" position 52 which produces an electrical signal from a switch 106 or other sensing device associated with the "up" position. This signal is again processed by the electrical circuit 107 to produce an output which operates the solenoid-controlled valves 103, 104 or 105 and hence the associated cylinders 100, 101 or 102.

It will be appreciated that the gear ratio selector arrangement described above enables both the main change speed gear set X and the range change input and output sets Z and Y to be simply and easily controlled from a single gear lever 50.

The forward/reverse selection in the transmission which is effected by the appropriate positioning of sleeves M and N is made using a further control such as a button or lever which may be mounted separately from lever 50 but could, if desired, be mounted on lever 50 as shown at 50a in FIG. 5.

Also, as will be appreciated, by positioning the range change positions 52 and 53 in extensions of the neutral plane n of the main change speed gear set X it is automatically ensured that no range change can be made unless the main change speed gear set is in its neutral condition.

Although in the arrangement described above the connection between the gear lever 50 and the sleeves M and N of input gear set Z is achieved using an electrical signal and hydraulic cylinders operated by solenoid-controlled valves, it will be appreciated that the connection between the gear lever 50 and sleeves M and N could take any suitable form and could, for example, be entirely mechanical if desired.

FIGS. 6 and 7 show two alternative shift patterns for gear lever 50. In FIG. 6 the up and down positions 52a and 53a are positioned in a plane J which is perpendicular to the neutral plane n but parallel to and intermediate the 1-2 and 3-4 planes of the H-gate 51. In FIG. 7 the up and down positions 52b and 53b are in a plane K which is perpendicular to the neutral plane n but parallel and to one side of the H-gate 51.

The shift pattern layouts shown in FIGS. 6 and 7 operate in the same manner as the gate described above with reference to FIGS. 4 and 5. Each time the lever 50 is moved to the up or down position the operative range is changed in the appropriate sense in the ABCD sequence. Again it will be evident that the location of the up and down positions ensures that range changes can only be made with the change speed gear set X in its neutral condition.

What is claimed is:

1. A gear selector means for use with a transmission having a main change speed gear set providing a plurality of change speed ratios and one or more associated range change gear sets, providing a plurality of transmission ranges, the selector means including a selector member which is movable to a plurality of positions for the selection of a said plurality of change speed ratios of the transmission and which has a neutral position or series of positions corresponding to a neutral condition of the transmission, the selector member being movable from the or a neutral position to a single "up" position in which upward range changes can be made in a predetermined sequence and to a single "down" position in which downward range changes can be made in a predetermined sequence, each movement of the selector member to said "up" or "down" position being arranged to change the operative range of the transmission either up or down to the next range in said predetermined sequence.

2. A gear selector means according to claim 1 wherein the selector member has a neutral plane of movement corresponding to a neutral condition of the transmission and the "up" and "down" positions are reached by further movement of the selector member in extensions of said neutral plane at opposite ends of said plane.

3. A gear selector means according to claim 1 wherein the selector member has a neutral plane of movement corresponding to a neutral condition of the transmission and the "up" and "down" positions are reached from said neutral plane by movement of the selector member in opposite directions in a plane at right angles to said neutral plane.

4. A gear selector means according to claim 3 wherein the selector member is movable in an H-shaped shift pattern to select at least some of the change speed ratios of the transmission, the crossbar of the H pattern providing the neutral plane of the selector member and the "up" and "down" positions being located in a plane lying parallel to and inbetween the other two planes of the H-shaped shift pattern.

5. A gear selector means according to claim 3 wherein the selector member is movable in an H-shaped shift pattern to select at least some of the change speed ratios of the transmission, the crossbar of the H pattern providing the neutral plane of the selector member and the "up" and "down" positions being located in a plane lying parallel to and outside the other two planes of the H-shaped shift pattern.

6. A gear selector means according to claim 1 wherein the selector member operates switch means each time it is moved to the "up" or "down" position in order to initiate said range change.

7. A gear selector means according to claim 6 wherein the switch means initiates the operation of solenoid-operated fluid control valves which in turn control the operation of hydraulically operated range change actuators.

8. A gear selector means according to claim 1 wherein the selector member carries a forward/reverse control member for initiating a change in the drive direction of the transmission.

* * * * *

UNITED STATES PATENT OFFICE
CERTIFICATE OF CORRECTION

Patent No. 4,590,817　　　　　　　　Dated May 27, 1986

Inventor(s) John S. Bennett

It is certified that error appears in the above-identified patent and that said Letters Patent are hereby corrected as shown below:

On the title page

The Application Number should be --584,971--.

Signed and Sealed this

Twenty-fifth Day of November, 1986

Attest:

DONALD J. QUIGG

Attesting Officer　　　Commissioner of Patents and Trademarks